United States Patent
Reuter et al.

[11] Patent Number: 5,967,625
[45] Date of Patent: Oct. 19, 1999

[54] BRAKING SYSTEM WITH INDEPENDENT ANTILOCK CONTROL CHANNELS

[75] Inventors: David Fredrick Reuter, Beavercreek; Earl Wayne Lloyd, Lebanon, both of Ohio

[73] Assignee: General Motors Corporation, Detroit, Mich.

[21] Appl. No.: 08/990,425

[22] Filed: Dec. 15, 1997

[51] Int. Cl.[6] ............................................. B60T 8/40
[52] U.S. Cl. ............................. 303/116.1; 303/DIG. 10
[58] Field of Search ................................ 303/10, 113.1, 303/115.1, 116.1, 119.1–119.3, DIG. 10

[56] References Cited

U.S. PATENT DOCUMENTS

| | | | |
|---|---|---|---|
| 5,529,388 | 6/1996 | Yasui | 303/116.1 |
| 5,538,336 | 7/1996 | Reuter et al. | 303/119.2 |
| 5,590,936 | 1/1997 | Reuter | 303/116.1 |
| 5,607,208 | 3/1997 | Reuter et al. | 303/113.5 |
| 5,609,401 | 3/1997 | Johnston et al. | 303/155 |
| 5,618,087 | 4/1997 | You | 303/119.2 |
| 5,890,778 | 4/1999 | Sager | 303/186 |

*Primary Examiner*—Chris Schwartz
*Attorney, Agent, or Firm*—Robert M. Sigler

[57] ABSTRACT

A braking system includes a master cylinder that is operational to introduce a manually effected braking pressure in the braking system and includes a wheel brake that is responsive to the manually effected braking pressure. A modulator is interconnected in the braking system between the master cylinder and the wheel brake and includes a pump that has an inlet and an outlet wherein the inlet is in continuous open fluid communication with the wheel brake through a first fluid passageway. The first fluid passageway is free of any flow restrictive orifices and the first fluid passageway is not in fluid communication with an accumulator. The modulator also includes a normally open valve that is positioned in a second fluid passageway and the second fluid passageway extends between the wheel brake and both the pump outlet and the master cylinder. During base brake operation of the braking system, the pump and the valve remain unoperated so that the manually effected pressure is freely transmitted to the wheel brake. During ABS release operation, the pump is turned on and the valve is energized to close, blocking the second fluid passageway so that a reduced wheel brake fluid pressure is effected at the wheel brake and a rate of reduction of the wheel brake pressure is established that is directly proportional to, and from a mechanical effect standpoint, is a result solely of pump flow rate.

10 Claims, 3 Drawing Sheets

BRAKING SYSTEM WITH INDEPENDENT ANTILOCK CONTROL CHANNELS

TECHNICAL FIELD

The present invention relates to a braking system with independent antilock control channels. More particularly, a vehicle braking system is disclosed that effects base and antilock braking functions in multiple individual control channels with each control channel being non-dependent upon the operation of the other control channels, through the use of a unique apply-release type operation that results in an effective system for high volume manufacture.

BACKGROUND OF THE INVENTION

A typical solenoid based anti-lock braking system (ABS), utilizes two solenoid valves per ABS control channel. One of the two solenoid valves is of the common normally open type, and the other is of the common normally closed type. When employed on a passenger vehicle, ABS is generally configured with three or four control channels so that a total of six or eight solenoid valves are required. In addition, two hydraulic pumps are typically used to move fluid through the three or four control channels. Two pump inlet accumulators, and two pump outlet damper assemblies are also included in the common fully operational system. This arrangement provides for maximum performance by enabling the wheel pressures to be individually regulated in various ways, and provides a system that operates in increasing pressure, holding pressure, and decreasing pressure states. Holding pressure states are made possible by employing both the normally open and normally closed valves and are typically required to temporarily maintain wheel brake pressure during an ABS cycle. The pump inlet accumulator is able to temporarily store fluid during a given release cycle, and is therefore, necessary for achieving acceptably high release rates for decreasing pressure during an ABS release cycle. However, this arrangement tends to be relatively costly since two independent valves and corresponding electrical drive circuits are required for operation of each ABS control channel. Sufficient space must also be allocated for packaging of the pump inlet accumulators. Additionally, the use of two accumulators and the structure of these prior art systems further increases cost.

As the use of ABS has proliferated in vehicle braking systems, further emphasis has been placed on driving the cost and space requirements out of the typical dual-solenoid per control channel system. Cost savings have been achieved to some extent by continuously downsizing and integrating system components such as the ABS control valve block, ABS pumps and ABS accumulators into a small size which can be packaged relatively easily underhood.

The art has also identified proportional pressure control solenoid valves as potentially useful in moving from dual solenoid per control channel ABS, to a multi-port, single flow control valve per control channel system. With this type of proportional solenoid valve, during ABS operation the single flow control valve feeds a controlled pressure to the wheel brake(s) by diverting excess pressure internally within the valve from the wheel brake to an accumulator. With the theory of proportional solenoid control now being well-known, mass produced systems of the type are conspicuously absent in passenger vehicle applications. This can be generally attributed to the undesirable complexity and cost of such a system. Additional approaches that purport to operate with a single valve per ABS control channel incorporate wheel dependencies that can be undesirable and which increase algorithm and system complexity adding to cost. Accordingly, a low cost alternative to the presently common dual solenoid ABS system remains highly desirable in the very competitive ABS braking system marketplace.

SUMMARY OF THE INVENTION

A principle aspect of the present invention is involved in the elimination of three or four relatively expensive solenoid valves and their corresponding electronic drivers from the conventional solenoid based ABS configuration. Elimination of two pump inlet accumulator assemblies from the standard configuration is a concomitant goal. A preferred and optional goal resides in the elimination of pump outlet dampers due to reduced pump pulse flow variations. As a result of the preset invention, an ability to maintain independent variable apply and release wheel modulation control for optimized performance and minimized algorithm complexity is sought. Advantageously, according to the present invention ABS is effectively configured for either front or rear wheel drive applications. Various efficient pump and valve packaging arrangements are beneficially made possible. Additionally, flexibility is increased in the ability to size each individual pump element to meet flow rate requirements for a given wheel brake compliance.

According to these aspects of the present invention, a braking system includes a master cylinder that is operational to introduce a manually effected braking pressure in the braking system and includes a wheel brake that is responsive to the manually effected pressure. A modulator is interconnected in the braking system between the master cylinder and the wheel brake and includes a pump that has an inlet and an outlet wherein the inlet is in continuous open fluid communication with the wheel brake through a first fluid passageway. The first fluid passageway does not include a flow restrictive orifice and the first fluid passageway is not in fluid communication with an accumulator. The modulator also includes a single normally open valve that is positioned in a second fluid passageway wherein the second fluid passageway extends between the wheel brake and both the pump outlet and the master cylinder. During base brake operation of the braking system, the pump and the valve remain unoperated so that the manually effected pressure is freely transmitted to the wheel brake. During ABS release operation, the pump is turned on and the valve is energized to close, blocking the second fluid passageway so that a reduced wheel brake fluid pressure is effected at the wheel brake wherein a rate of reduction of the wheel brake pressure is established that is directly proportional to, and from a mechanical effect standpoint, is a result solely of pump flow rate. During ABS apply operation, the pump continues to run but the apply valve is now opened. The flow through the valve orifice is substantially greater than pump return flow for any substantial pressure differential that exists between master cylinder and wheel brake. The net effect is that pressure rebuilds at the wheel approximately to the driver's intended master cylinder pressure with only a small pressure loss across the solenoid valve as the fluid is recirculated. Switching the apply valve on and off at appropriate times thus allows pressure at the wheel brake to be modulated to some intermediate level sufficient to maintain anti-lock control.

BRIEF DESCRIPTION OF THE DRAWINGS

The present invention will now be described by way of example, with reference the accompanying drawings, in which.

DESCRIPTION OF THE PREFERRED EMBODIMENTS

The following description describes in detail, a new, low cost ABS System that deviates from the baseline prior art eight/six-valve type that uses two solenoid valves per ABS control channel, to a four/three-valve type that uses one solenoid valve per ABS control channel. This is achieved in-part, by focusing cost reduction efforts on changing from the conventional Apply-Hold-Release type of wheel rotational control to an Apply-Release type of wheel rotational control. Additional cost reductions are achieved through the preferred elimination of pump inlet accumulators that are normally associated with closed-loop hydraulic recirculation type systems, and by subsequent sizing of pump capacity for instantaneous wheel brake release flow rates. This concept also has the additional benefits of improving back-up operations, eliminating normally closed valves and their associated stringent, static leak rate requirements, and making the unit easier to process at vehicle manufacturing assembly plants through the elimination of discrete, normally closed hydraulic passageways in the modulator.

Figure 1:
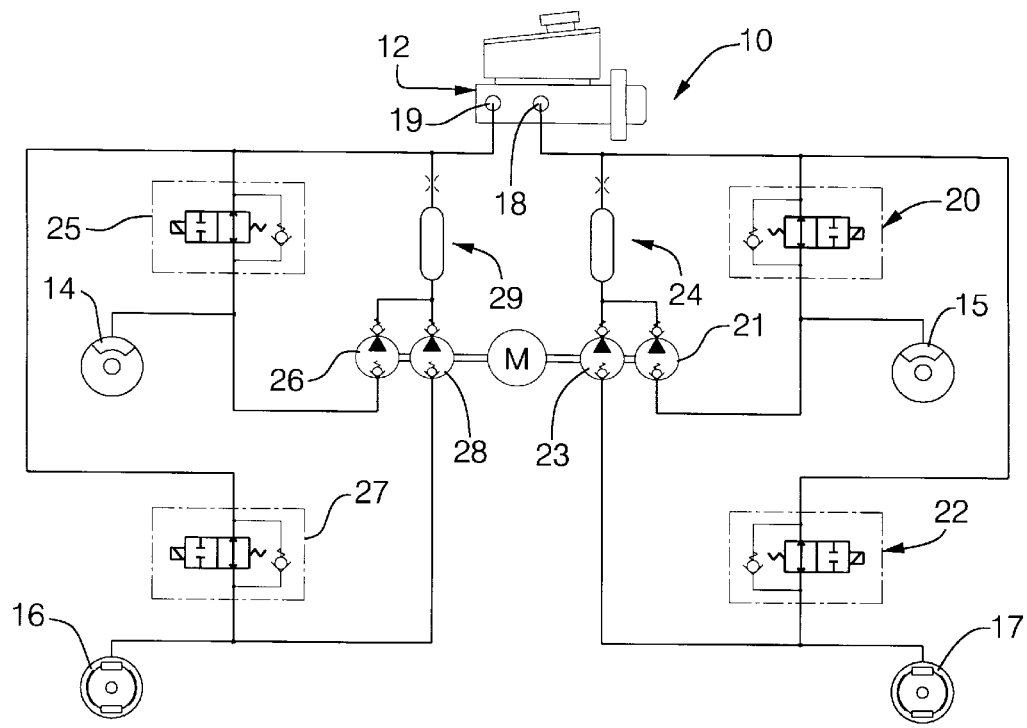
FIG. 1 is a diagrammatic illustration of the hydraulic circuit for four channel ABS according to the present invention.

Referring to the drawings, illustrated in FIG. 1 is a braking system 10 that is hydraulically arranged in a diagonally split configuration. The braking system 10 includes a conventional master cylinder assembly 12 and four wheel brakes 14–17. A front wheel brake 15 and a rear wheel brake 17 are connected to the primary chamber of the master cylinder 12 through port 18. Additionally, a front wheel brake 14 and a rear wheel brake 16 are connected to the secondary chamber of master cylinder 12 through port 19. A series of conduits provide a passageway between the port 18 and wheel brake 15 through a normally open solenoid operated valve 20. In addition, the wheel brake 15 is connected directly to the inlet of a motor driven pump assembly 21 with no valves and no flow restrictive orifices of any kind existing in the fluid passageway between the wheel brake 15 and the pump assembly 21. A flow restrictive orifice is a device such as an orifice plate or a valve that has a reduced or reduceable cross sectional opening in the flow stream when compared to the passageway. The outlet of the pump assembly 21 communicates with the master cylinder 12 at port 18 and with the normally open valve 20, through flow passageways provided by a series of interconnected conduits. Port 18 of master cylinder 12 is also connected with wheel brake 17 through normally open solenoid operated valve assembly 22. Additionally, wheel brake 17 is connected to the inlet of motor driven pump assembly 23 with no valves and no flow restrictive orifices of any kind existing in the fluid passageway between the wheel brake 17 and the pump assembly 23 therebetween. The outlet of pump assembly 23 is connected to port 18 of master cylinder 12 and to solenoid valve 22 through fluid passageways provided by a series of interconnected conduits. An optional damper assembly 24 is provided near the outlets of pump assemblies 21 and 23 if preferred, and operates to reduce the effects of any noise created by the operation of pumps.

In a similar manner, wheel brake 14 is connected with port 19 of master cylinder 12 through a flow passageway consisting of a number of interconnected conduits that includes normally open solenoid operated valve 25. Wheel brake 14 is connected directly with the inlet of motor driven pump assembly 26 with no valves and no flow restrictive orifices of any kind existing in the fluid passageway between the wheel brake 14 and the pump assembly 26. The outlet of pump assembly 26 is connected with the port 19 of master cylinder 12 and the valve 25 through fluid passageways provided by a series of interconnected conduits. Additionally, wheel brake 16 is connected with port 19 of master cylinder 12 through a flow passageway provided by a series of interconnected conduits that includes normally open solenoid operated valve assembly 27. Wheel brake 16 is also connected directly to the inlet of motor driven pump assembly 28 with no valves and no flow restrictive orifices of any kind existing in the flow passageway between the wheel brake 16 and the pump assembly 28. The outlet of pump assembly 28 is connected back with the port 19 and with the valve 27 through flow passageways consisting of a series of interconnected conduits. An optional damper assembly 29 is provided near the outlets of pumps 26 and 28 if preferred, and operates to reduce the effects of any noise generated by the operation of pumps. The braking system 10 provides four ABS control channels so that each of the wheel brakes 14–17 is independently modulated as determined by the operation of an electronic controller as is known in the art.

Figure 2:
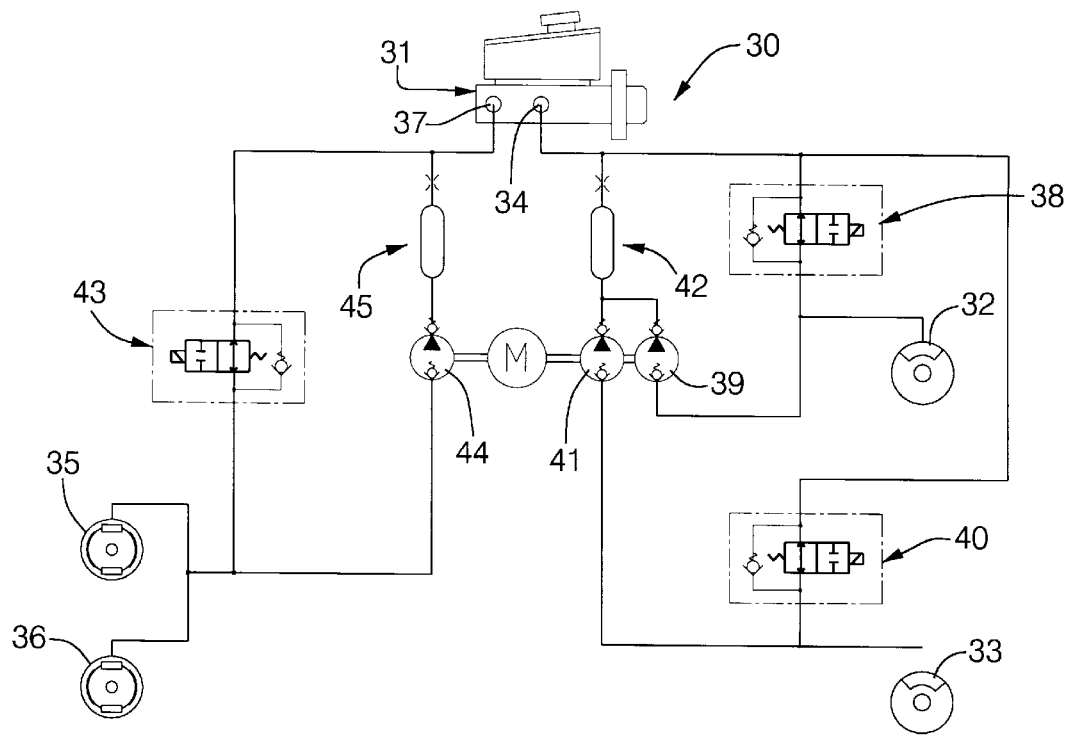
FIG. 2 is a diagrammatic illustration of the hydraulic circuit for three channel ABS according to the present invention.

Referring to FIG. 2, another braking system 30 is arranged in a three-channel front-to-rear split configuration. The primary chamber of master cylinder assembly 31 is connected to wheel brake 32 and wheel brake 33 through port 34. The secondary chamber of master cylinder assembly 31 is connected to wheel brake 35 and wheel brake 36 through port 37. Wheel brake 32 is connected to port 34 through a flow passageway consisting of a series of interconnected conduits which include a normally open solenoid operated valve 38. Wheel brake 32 is also directly connected to the inlet of motor driven pump assembly 39 through a flow passageway consisting of a series of interconnected conduits with no valves and no flow restrictive orifices of any kind existing in the passageway between wheel brake 32 and pump assembly 39. The outlet of pump assembly 39 is connected back with port 34 of master cylinder assembly 31 and with the valve 38 through flow passageways consisting of a series of interconnected conduits. Wheel brake 33 is connected with port 34 of master cylinder assembly 31 through a flow passageway consisting of a series of interconnected conduits that include normally open solenoid operated valve 40. Wheel brake 33 is also connected to the inlet of motor driven pump assembly 41 through a flow passageway consisting of a series of interconnected conduits with no valves and no flow restrictive orifices of any kind existing in the passageway between wheel brake 33 and pump assembly 41. The outlet of pump 41 is connected back with the port 34 and the valve 40 through flow passageways consisting of a series of interconnected conduits. An optional damper assembly 42 is provided near the outlets of pumps 39 and 41 if preferred, and operates to reduce the effects of noise generated by operation of the pumps. Wheel brakes 35 and 36 are interconnected and are commonly connected with the port 37 of master cylinder assembly 31 through a flow passageway consisting of a series of interconnected conduits that include the normally open solenoid operated valve 43. Wheel brakes 35 and 36 are also directly connected with the inlet of motor driven pump assembly 44 through a flow passageway comprising a series of interconnected conduits that do not contain any valves or flow restrictive orifices of any kind. The outlet of pump 44 is connected back with the port 37 and the valve 43 through flow passageways consisting of a series of interconnected conduits which may include an optional damper assembly 45 positioned near the outlet of pump 44.

Figure 3:
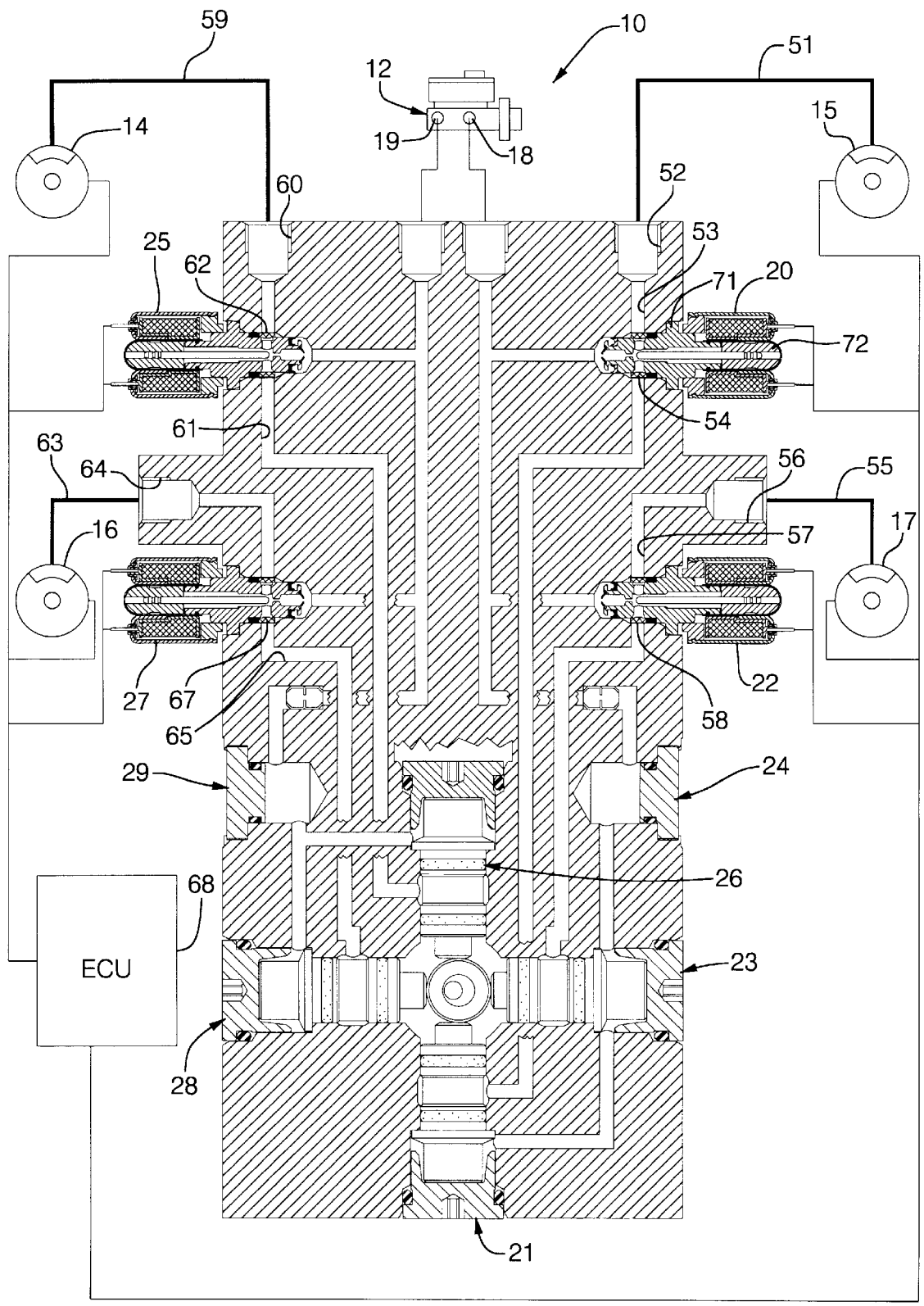
FIG. 3 is a detail fragmentary cross sectional schematic illustration of the ABS system of FIG. 1.

Referring to FIG. 3, the braking system 10 of FIG. 1 is schematically illustrated in greater detail. The master cylinder 12 and the wheel brakes 14–17 are hydraulically connected to various ports of the modulator assembly 50. The valves 20, 22, 25, and 27 along with the optional damper assemblies 24 and 29 and the pumps 21, 23, 26 and 28 are all carried in the modulator assembly 50. The valves 20, 22, 25 and 27 each include a body 71 that is received within a stepped bore of the modulator 50. Each body 71 includes a longitudinal bore and a transverse bore intersecting the longitudinal bore. An opening of each longitudinal bore is covered by a filter and an opening of each transverse bore is covered by an annular filter that exists in the various annular spaces 54, 58, 62 and 67. A seal is provided between the body 71 and the modulator 50 within the step bore. The body 71 includes an annular shoulder that sits within a step for accurately setting the depth of the valves 20, 22, 25 and 27 within the modulator 50. Peening, staking, or other suitable processes are used to form the modulator base material over the top of the solenoid valve body shoulder to positively retain the valve body 71 in the stepped bore. A cylindrical sleeve with a closed end is received over the body 71. An armature 72 is slidably received in the cylindrical sleeve and is biased towards the closed end by a spring. The spring bears against a fixed support. A rod is carried by the armature and extends through the spring and support with an end interacting with the valve seat to provide a flow control mechanism in the hydraulic componentry of the valves 20, 22, 25 and 27 between the internal longitudinal and transverse bores. A seal is carried by the valve body 71 and provides a one-way bypass around the valve seat acting as an internal check for flow from the various wheel brakes to the master cylinder.

The magnetic circuit of the solenoid valves 20, 22, 25 and 27 each includes an end plate, a case, the valve body 71 and the armature 72. The primary air gap is provided between the armature 72 and the valve body 71. The secondary air gaps are provided by the nonmagnetic sleeve and the space between the armature 72 and the end plate, and at the juncture between a case extension and valve body 71. A preferred configuration of the valves 20, 22, 25 and 27 are more fully described in U.S. patent application Ser. No. 08/763137 entitled Solenoid Coil Positioning Assembly, which is assigned to the assignee of the present invention and is specifically incorporated herein by reference.

Port 18 of master cylinder 12 is open directly to the cavities of modulator 50 that carry valves 20 and 22. Since the valves 20 and 22 are normally open, a normally open connection is provided directly to the wheel brake 15 and 17. The wheel brake 15 is connected directly back to the pump assembly 21 through conduit 51, port 52 and conduit 53. Fluid freely flows through the conduit 53 around the valve 20 via annular space 54. Wheel brake 17 is connected directly back to the pump assembly 23 through conduit 55, port 56 and conduit 57. Fluid freely flows through conduit 57 around the valve 22 via the annular space 58. Port 19 of master cylinder assembly 12 is connected directly to the cavities of modulator 50 that carry the valves 25 and 27. Wheel brake 14 is connected to the pump assembly 26 through conduit 59, port 60 and conduit 61. Fluid freely flows through the conduit 61 around valve 25 via annular space 62. Wheel brake 16 is connected to pump assembly 28 through conduit 63, port 64 and conduit 65. Fluid freely flows through the conduit 65 around valve 27 via annular space 67. An electronic control unit 68 is associated with the braking system 10 and communicates with wheel speed sensors at each of the wheels corresponding to the wheel brakes 14–17 and with the valves 20, 22, 25, and 27 to control wheel brake pressure in a pre-programmed manner as is known in the art. The internal conduits of the modulator 50 are shown to clarify operation of the braking system 10 but will likely be provided out of a single plane in the modulator 50 and will be provided by simplified straight bore segments.

Packaging

The ABS design approach as shown in FIGS. 1–3 allows for the elimination of relatively expensive components, including normally closed ABS release valves, pump inlet accumulators, and as previously noted, leads to the optional elimination of pump outlet damper assemblies. One method for packaging the four pump element approach is shown in FIG. 3. This design uses an ABS radial piston pump with the four pumps 21, 23, 26 and 28 arranged at 90 degrees relative to one another. This arrangement is an advantageous design for high volume manufacturability due to the completely orthogonal layout for ease of machining and assembly. Other possibilities include radial designs with other-than 90 degree layout and an "opposed four" layout where the elements are side-by-side. For front-rear hydraulic split configurations (as shown in FIG. 2), that are normally associated with rear-wheel-drive vehicles, a preferred 120 degree symmetric, and other non-symmetric layouts are also possible. Still another scheme is to utilize an axial piston pump with 3 or 4 pistons and corresponding independent inlets and outlets to keep channels separated (not illustrated), that run on an appropriate dry swash plate with roller thrust bearings. These arrangements allow a competitively packaged unit for a low cost market.

Operation

Figure 6:
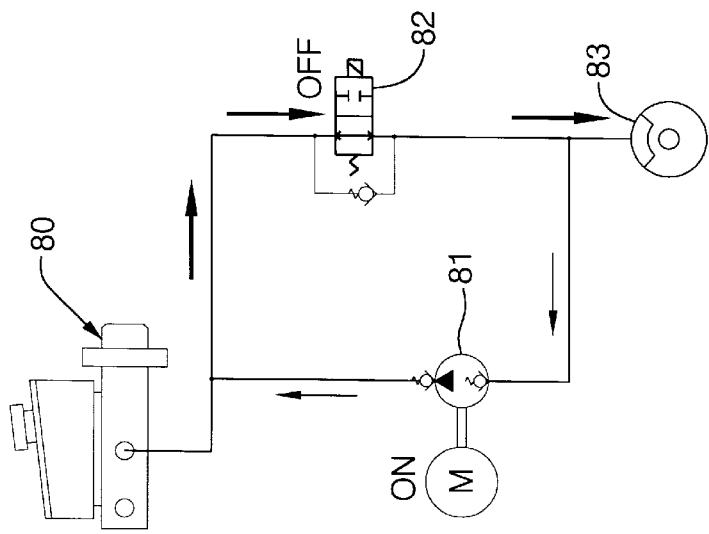
FIG. 6 is a schematic illustration of a single control channel of the ABS systems of FIGS. 1 and 2 shown in an ABS apply operational mode.
Figure 5:
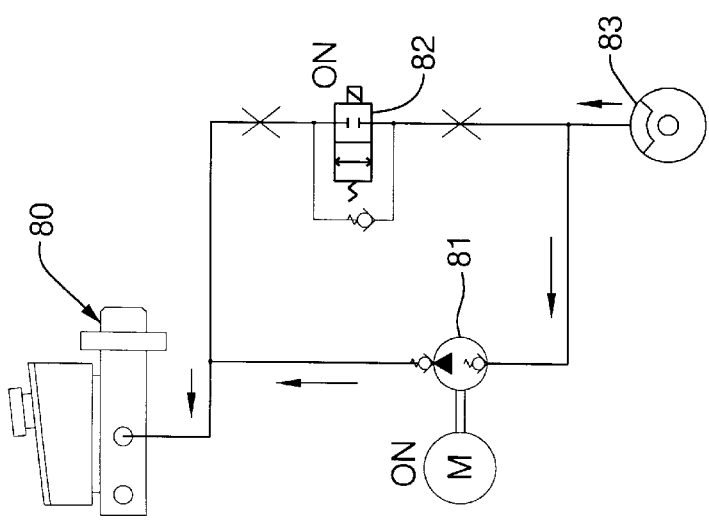
FIG. 5 is a schematic illustration of a single control channel of the ABS systems of FIGS. 1 and 2 shown in an ABS release operational mode.
Figure 4:
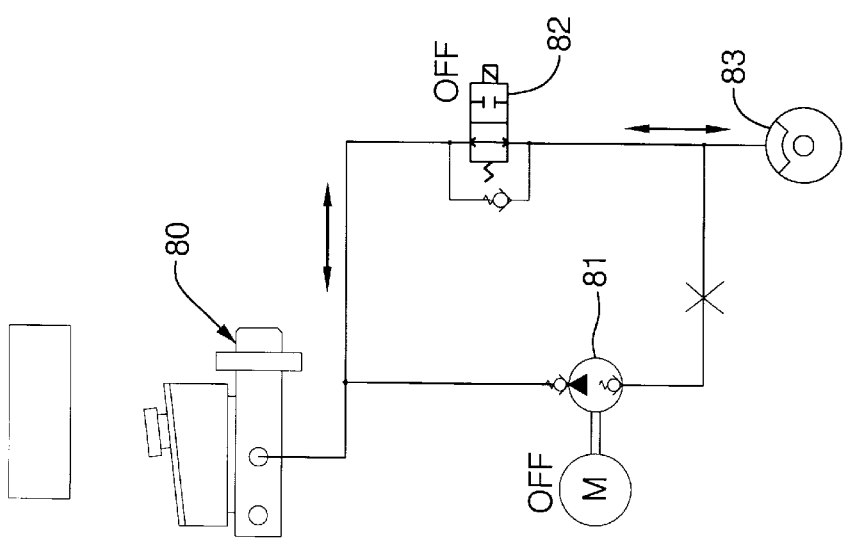
FIG. 4 is a schematic illustration of a single control channel of the ABS systems of FIGS. 1 and 2 shown in a base brake operational mode.

Referring to FIGS. 4–6, an individual ABS control channel representative of the ABS control channels of the braking systems 10 and 30, is shown without the optional damper assemblies. The hydraulic configuration is such that in the base brake mode of operation, no electrical power for the hydraulic modulator 50 is required for manual operation. In FIG. 4 it can be observed that with no power being supplied to the pump 81, and with the normally open valve 82 de-energized, fluid flow and pressure transmission occurs directly between the master cylinder 80 and the wheel brake 83 in both the apply and release directions, allowing normal base brake operation. Fluid flow is prevented through the passageway between wheel brake 83 and pump assembly 81, by the pump assembly 81.

ABS is initiated for example, when an excessive amount of wheel rotational error such as skid or slip is detected by the electronic control unit that continuously monitors wheel speed sensors as shown in FIG. 3. The electronic control unit in turn commands the hydraulic unit to begin wheel pressure modulation. As demonstrated by FIG. 5, the pump 81 is immediately turned on and the normally open valves of all wheels where immediate pressure reduction is required are energized to close. This is represented in FIG. 5 by the energization of valve 82. Fluid flow and pressure transmission from the master cylinder 80 to the wheel brake 83 is prevented by the valve 82. ABS release action has the effect of reducing the line pressure at the pump inlet and in response, at the wheel brake(s) where pressure reduction is required. The instantaneous pressure release rate is kinematically defined by pump flow rate and by caliper compliance.

Once sufficient pressure reduction has occurred at the wheel brake(s) that have fallen under ABS control, the associated wheel is allowed to begin to re-accelerate. As demonstrated by FIG. 6, the normally open valve 82 is de-energized and fluid is forced to the wheel brake 83 by the pressure differential between the master cylinder/pump outlet and the wheel brake. The valve 82 is sized sufficiently large so that a fully open valve allows a predetermined pressure apply rate at the wheel for fast disturbance recovery. Additionally, the valve's opening is sized so that when the valve is fully open during an ABS cycle, and simultaneously the pump is continuously running, the pressure drop across the valve due strictly to pump flow rate is sufficiently small so that high wheel pressures are maintained during the period of full circulation. With these solenoid valve design conditions in place, periodically pulsing the valve open (i.e. momentarily de-energizing and re-energizing in prescribed patterns), obtains the desired apply pressure build rate. If the valve is pulsed fast enough, at a high enough frequency through known pulse width modulation control, the inlet flow to the wheel is regulated in an analog fashion. This is similar to having an instantaneously variable orifice, as opposed to a more discrete on/off type of conventional control which tends to be less smooth and more noise-prone in operation. This type of valve control is especially beneficial for the present apply-release type of system. This is because there is usually a fairly high period of activity defining the duty cycle, which is associated with flow control during wheel pressure apply cycles. When required, the electronic control unit uses pulsed operation of the valve 82 to adjust the valve equivalent flow rate so that it equals the pump flow rate. As a result, the system maintains a set pressure at the wheel brake 83 for improved algorithm control.

New ABS systems according to the present invention use the design concept of an independent, normally open valve and a single pump element hydraulic circuit for each ABS control channel. This simplified and direct approach to wheel control has a number of inherent design advantages. The maintenance of independent wheel pressure modulation control results from the pump and valve arrangement. The provision of a simplified hydraulic default to base brakes condition results from the hydraulic layout. Hydraulic system complications related to leakage and debris handling are reduced with the removal of the normally closed valves from the hydraulic circuit. Eliminating the cost of pump inlet accumulators is made possible. The optional elimination of pump outlet dampers which are typically used to reduce noise and brake pedal pulsations generated by pump outlet flow surges, is possible since the three or four total pump flow pulses per revolution will be individually smaller and in the case of four pumps, may be spaced at 90 degree intervals versus the usual conventional two larger pump flow pulses per revolution spaced at 180 degree intervals. Additionally, the pump elements can be sized for individual wheel compliance conditions to minimize total power consumption.

We claim:

1. A braking system comprising:
   a master cylinder that is operational to introduce a manually effected braking pressure in the braking system;
   a wheel brake that is responsive to the manually effected pressure; and
   a modulator interconnected in the braking system between the master cylinder and the wheel brake including a pump that has an inlet and an outlet wherein the inlet is in continuous open fluid communication with the wheel brake through a first fluid passageway, wherein the first fluid passageway does not include a flow restrictive orifice and the first fluid passageway is not in fluid communication with an accumulator, and wherein the modulator includes a normally open valve that is positioned in a second fluid passageway wherein the second fluid passageway extends between the wheel brake and both the pump outlet and the master cylinder wherein during a base brake operation of the braking system, the pump and the valve remain unoperated so that the manually effected pressure is freely transmitted to the wheel brake, and during an ABS release operation, the pump is turned on and the valve is energized to close, blocking the second fluid passageway so that a reduced wheel brake fluid pressure is effected at the wheel brake wherein a rate of reduction of the wheel brake pressure is established that is directly proportional to, and from a mechanical effect standpoint, a result solely of flow rate of the pump.

2. A braking system according to claim 1 further comprising at least one other wheel brake wherein the rate of reduction of the wheel brake pressure is hydraulically independent of any operational conditions at any of the at least one other wheel brakes.

3. A braking system according to claim 2 wherein each of the at least one other wheel brakes are each connected to an independent pump so that no more than one wheel brake is connected to any given pump.

4. A braking system according to claim 1 wherein an ABS apply operation is associated with the ABS release operation and during the ABS apply operation the pump remains on and is capable of achieving a pump output pressure, and wherein the valve is de-energized allowing flow through the valve from the pump outlet to the wheel brake and wherein the valve includes a flow area that results in a pressure drop across the valve and wherein the flow area is large enough to permit a substantial flow through the valve to effect an increase in fluid pressure at the wheel brake as the pump continues to draw fluid from the wheel brake to the inlet of the pump wherein a final achievable wheel pressure is equal to a difference between the pump output pressure and the pressure drop across the valve.

5. A braking system comprising:
   a master cylinder that is operational to introduce a manually effected braking pressure in the braking system at a driver intended master cylinder pressure level;
   a wheel brake that is responsive to the manually effected pressure; and
   a modulator interconnected in the braking system between the master cylinder and the wheel brake including a pump that has an inlet and an outlet wherein the inlet is in continuous open fluid communication with the wheel brake through a first fluid passageway, wherein the modulator includes a normally open valve that is positioned in a second fluid passageway wherein the second fluid passageway extends between the wheel brake and both the pump outlet and the master cylinder wherein during a base brake operation of the braking system, the pump and the valve remain unoperated so that the manually effected pressure at the driver intended master cylinder pressure level is freely transmitted to the wheel brake, and during an ABS operation cycle, for ABS release the pump is turned on and the valve is energized to close, blocking the second fluid passageway so that a reduced wheel brake fluid pressure is effected at the wheel brake wherein a rate of reduction of the wheel brake pressure is established that is directly proportional to, and from a mechanical effect standpoint, a result solely of flow rate of the pump, and for ABS apply the pump continues to run and the valve is energized to open, opening the second fluid passageway while the first fluid passageway is open wherein flow through the first fluid passageway from the wheel brake to the pump inlet is substantially less than flow through the second fluid passageway to the wheel brake so that the driver intended master cylinder pressure level is approximately reestablished at the wheel brake.

6. A braking system according to claim 5 further comprising at least one other wheel brake wherein the rate of reduction of the wheel brake pressure is hydraulically independent of any operational conditions at the at least one other wheel brake.

7. A braking system according to claim 6 wherein each of the at least one other wheel brakes are each connected to an independent pump so that no more than one wheel brake is connected to any given pump.

8. A braking system according to claim 5 wherein during the ABS operation cycle the braking system switches directly between ABS release and ABS apply only in modulating wheel brake pressure for all circumstances.

9. A braking system according to claim 8 wherein during ABS release a rate of reduction of wheel brake pressure is established that is directly proportional to, and from a mechanical effect standpoint, a result solely of flow rate of the pump.

10. A braking system comprising:
a master cylinder that is operational to introduce a manually effected braking pressure in the braking system at a driver intended master cylinder pressure level;
a wheel brake that is responsive to the manually effected pressure; and
a modulator interconnected in the braking system between the master cylinder and the wheel brake including a pump that has an inlet and an outlet wherein the wheel brake is also responsive to fluid pressure generated by the pump, wherein the inlet is in continuous open fluid communication with the wheel brake through a first fluid passageway so that when the pump is operating, fluid is drawn from the wheel brake without exception, wherein the modulator includes a normally open valve that is positioned in a second fluid passageway wherein the second fluid passageway extends between the wheel brake and both the pump outlet and the master cylinder wherein during a base brake operation of the braking system, the pump and the valve remain unoperated so that the manually effected pressure is freely transmitted to the wheel brake at the driver intended master cylinder pressure level, and during an ABS operation cycle, for ABS release the pump is turned on and the valve is energized to close, blocking the second fluid passageway so that a reduced wheel brake fluid pressure is effected at the wheel brake by fluid draw by the pump wherein a rate of reduction of the wheel brake pressure is established that is directly proportional to, and from a mechanical effect standpoint, a result solely of flow rate of the pump, and for ABS apply the pump continues to run and the valve is energized to open, opening the second fluid passageway while the first fluid passageway is open wherein flow through the first fluid passageway from the wheel brake to the pump inlet is substantially less than flow through the second fluid passageway to the wheel brake so that the driver intended master cylinder pressure level is approximately reestablished at the wheel brake.

* * * * *